P. R. JENKINS.
Cultivator.

No. 120,073.

Patented Oct. 17, 1871.

Witnesses:
E. Wolff.
Francis McArdle.

Inventor:
P. R. Jenkins.
Per Munn & Co
Attorneys.

UNITED STATES PATENT OFFICE.

PHILIP R. JENKINS, OF COTTONVILLE, IOWA.

IMPROVEMENT IN CULTIVATORS.

Specification forming part of Letters Patent No. 120,073, dated October 17, 1871.

*To all whom it may concern:*

Be it known that I, PHILIP R. JENKINS, of Cottonville, in the county of Jackson and State of Iowa, have invented a new and useful Improvement in Cultivators; and I do hereby declare that the following is a full, clear, and exact description thereof, which will enable others skilled in the art to make and use the same, reference being had to the accompanying drawing forming part of this specification.

Figure 1:
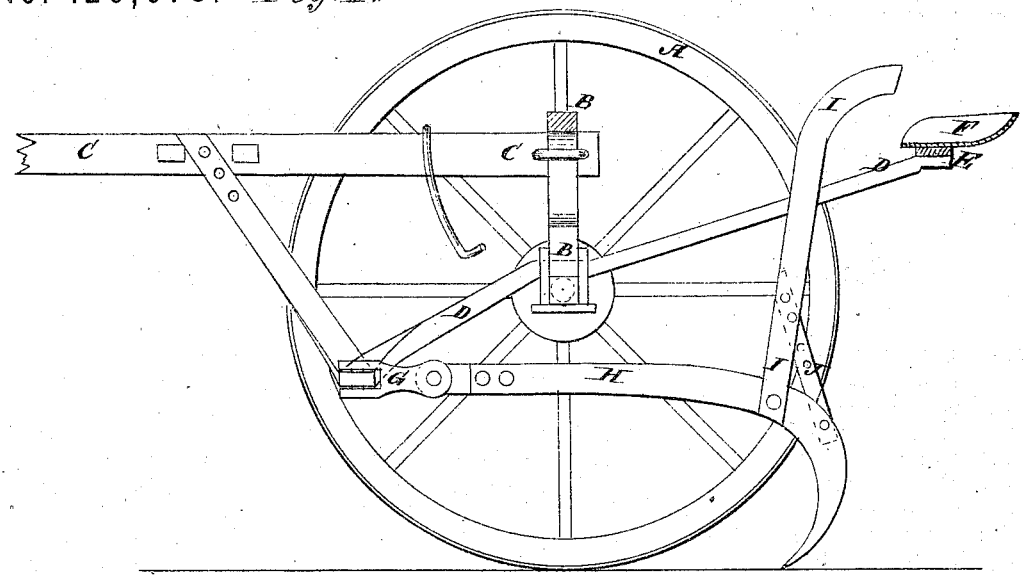
Figure 2:
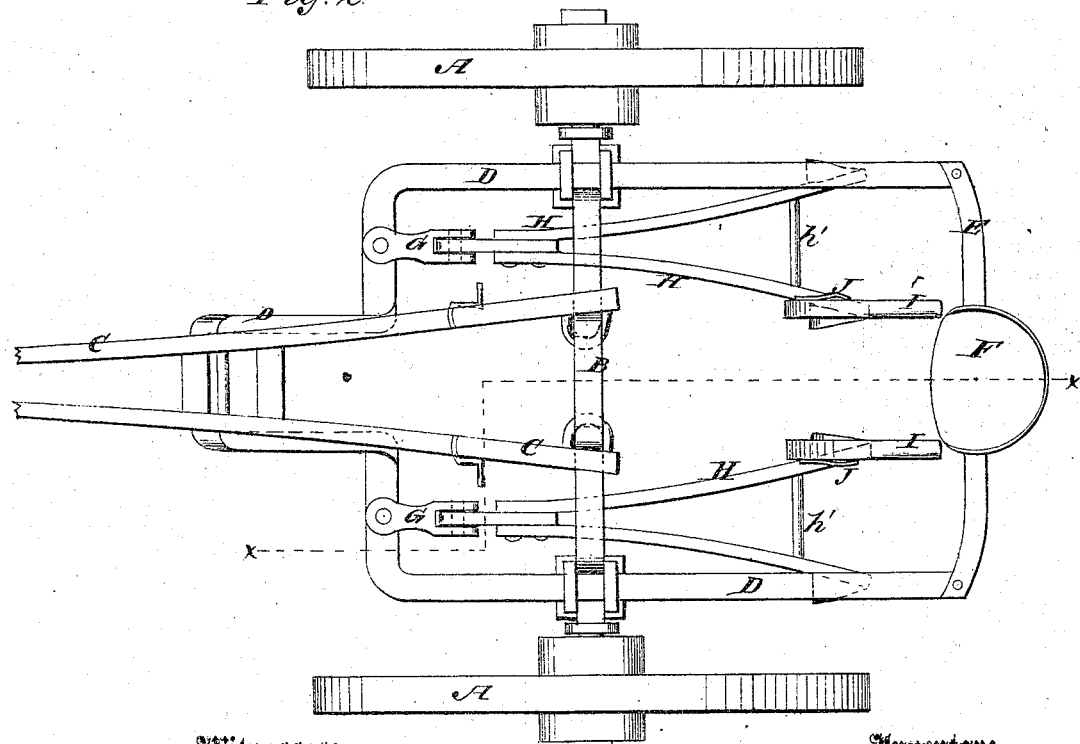

Figure 1 is a detail vertical section of my improved cultivator taken through the line $x\ x$, Fig. 2. Fig. 2 is a top view of the same.

My invention has for its object to furnish an improved cultivator, simple in construction, convenient in use, and effective in operation, and which shall be so constructed that it may be easily adjusted for use as a riding or walking-cultivator, as may be desired; and it consists in the construction and combination of the various parts, as hereinafter more fully described.

A are the wheels, which revolve upon the journals of the axle B. The axle B is made with several bends or angles, as shown in Figs. 1 and 2, to raise its middle part, to enable it to pass over tall plants without injuring them, and also to furnish suitable places for the attachment of the tongue C and bars or frame D. The bars D are secured to the axle B near the inner ends of the hubs of the wheels A, and their rear parts are inclined upward slightly and connected by a cross-bar, E, to which the seat F is attached, the ends of said bar E being detachably bolted to the ends of the bars D, so that the said bar E can be conveniently detached when it is desired to use the machine as a walking-cultivator. The upward inclination of the rear part of the bars D should be such as to bring the seat F about upon a level with the middle part of the axle B. The forward parts of the bars D are inclined downward, as shown in Fig. 1; are bent inward, as shown in Fig. 2, to form a place for the attachment of the plow-beams; and are bent upward, and their forward ends are attached to the sides of the tongue C by a bolt, several holes being formed in the said bars to receive the said bolt, so that said bars may be conveniently adjusted as may be required to regulate the depth at which the plows work in the ground. To the horizontal parts of the bars D are pivoted the forward ends of the couplings G, as shown in Figs. 1 and 2, so that the rear ends of the said couplings may have a free lateral movement. To the rear ends of the couplings G are pivoted the forward ends of the plow-beams H, or a block or bar, to which said plow-beams are attached, as shown in Figs. 1 and 2, so that the said plow-beams may have a free vertical movement. Two plow-beams, H, are connected with each coupling, G, which may be made of different lengths, and which incline from each other, and the rear parts of which are held in their proper relative positions by a cross-bar or long bolt, $h'$, as shown in Fig. 2. The rear ends of the beams H are curved downward to serve as plow-standards, and have plows formed upon or attached to their lower ends. I are the handles, the lower end of one of which is pivoted to the inner beam of each pair of beams, H. The upper end of each handle, I, extends up into such a position that it can be conveniently reached and operated by the driver from his seat. The handles I are supported at the desired elevation by the braces J, the lower ends of which are secured to the lower parts of the inner beams H, and the upper ends of which are bolted to the said handles I, several holes being formed in the braces to receive the said bolts, so that the said handles I can be conveniently lowered to any desired height to adjust the machine for use as a walking-cultivator. When used as a riding-cultivator the plows may be guided by means of the handles I, or the plowman may guide the plows with his feet.

Having thus described my invention, I claim as new and desire to secure by Letters Patent—

The arrangement of the frame D E at an elevation above the axle in the rear, and at a depression below the same in front, while rigidly supported on the axle at about one-third the distance from the front of said frame, as and for the purpose specified.

PHILIP R. JENKINS.

Witnesses:
J. B. JENKINS,
C. L. CLOSSON.